United States Patent [19]

Tucker

[11] 3,750,396

[45] Aug. 7, 1973

[54] VORTEX VALVE FUEL DISTRIBUTION SYSTEM FOR GAS TURBINE ENGINES

[75] Inventor: Stephen B. Tucker, Cincinnati, Ohio

[73] Assignee: General Electric Company, Cincinnati, Ohio

[22] Filed: Nov. 1, 1971

[21] Appl. No.: 194,668

[52] U.S. Cl. .................. 60/39.74 R, 60/39.28 R
[51] Int. Cl. .............................................. F02c 9/02
[58] Field of Search ............ 60/39.74 R, 39.28 R; 239/533, DIG. 3; 137/81.5

[56] References Cited
UNITED STATES PATENTS

| | | | |
|---|---|---|---|
| 2,603,535 | 7/1952 | Ipsen | 60/39.74 R |
| 2,963,862 | 12/1960 | Jay | 60/39.74 R |
| 3,592,213 | 7/1971 | Smith | 137/81.5 |
| 3,643,428 | 2/1972 | Marshall | 137/81.5 |

Primary Examiner—Douglas Hart
Attorney—Derek P. Lawrence et al.

[57] ABSTRACT

A fuel distribution system for a gas turbine engine includes a plurality of vortex valves to accurately distribute fuel to fuel injection points of the engine. Metered fuel is delivered to a flow proportioner, which divides the metered fuel between two manifolds. Each manifold, in turn, delivers the fuel to either the control inlets or the power inlets of the vortex valves. Dual outlet vortex valves are used to reduce weight and to simplify the system. The outputs of the vortex valves are delivered to fuel injection points of the engine. A fuel-to-air heat exchanger is positioned within the system between the flow proportioner and one of the fuel manifolds.

10 Claims, 6 Drawing Figures

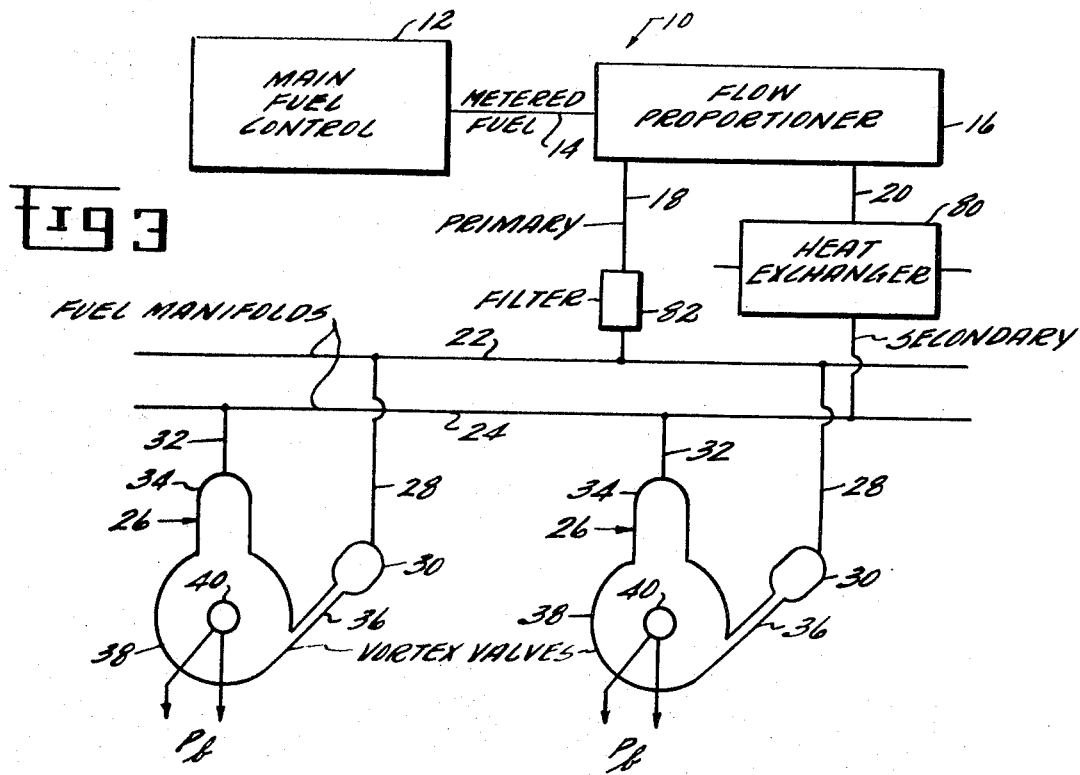
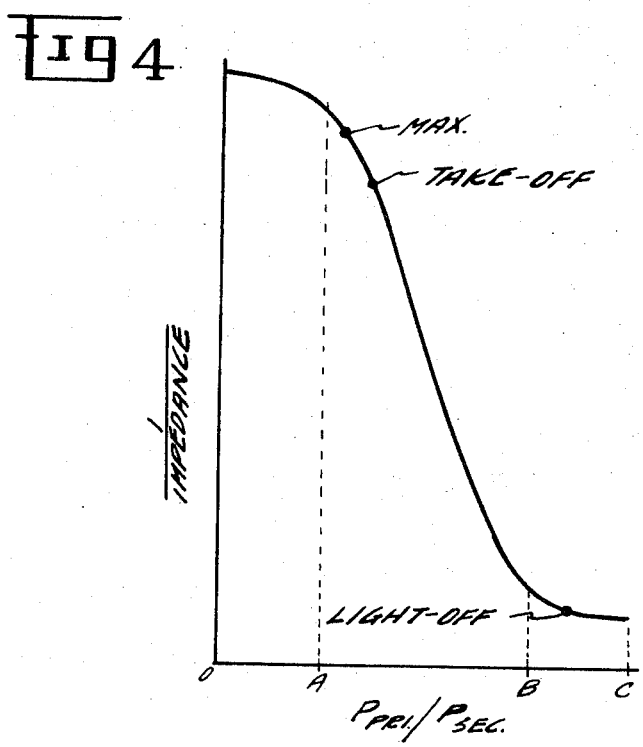

INVENTOR.
STEPHEN B. TUCKER
BY
T. J. Bird, Jr.
AGENT 3,750,396

VORTEX VALVE FUEL DISTRIBUTION SYSTEM FOR GAS TURBINE ENGINES

BACKGROUND OF THE INVENTION

This invention relates generally to fuel distribution systems for gas turbine engine combustors and, more particularly, to a fuel distribution system which utilizes vortex valves to accept the metered fuel flow from a fuel control and divide it accurately between all fuel injection points.

A fuel distribution system for a gas turbine engine must accept metered flow from a fuel control and split it equally among each of the nozzles, or scroll cups, which form fuel injection points in the engine combustion system. This requirement is somewhat difficult to achieve in that modern gas turbine engines have reached the point in size where significant pressure differences can exist within fuel lines at the top and the bottom of the engine due to head effects on the fuel alone. To reduce this effect it is desirable to have a small effective area, with the attendant high pressure level, in the fuel injection nozzles for low flows and to have a larger area for the higher flows to keep from overloading the fuel pump. Said in another way, in order to divide the needed fuel flow from the fuel control accurately between all the fuel injection points, it is necessary for the fuel distribution system to have a variable impedance.

Presently used fuel distribution systems for gas turbine engines normally include spring loaded, contoured valves which are positioned between the fuel control and each fuel injection point. These valves schedule flow area as a function of pressure drop across the valves. The pressure drop across the valves is controlled by the fuel control itself. While such systems have proven to be relatively successful in the past, they have certain disadvantages, the primary ones being the requirement for extremely small areas to maintain minimum flow conditions and the requirement for moving parts within the fuel flow system.

The advent of highly sophisticated airborne electronic equipment has added to the fuel distribution system problems by creating an increasing need for electronic cooling capacity (heat sink) in addition to normal aircraft flight control systems (hydraulic fluid) and environmental systems cooling needs. This is true in relatively low speed transport aircraft and high speed military or commercial aircraft. This becomes a problem for the fuel distribution system in that aircraft fuel is the major source of the required coolant and is relied on heavily by aircraft and engine designers to avoid the use of air-to-air or other auxiliary heat exchangers to provide airframe and engine systems cooling.

Further complicating the problem is the range of operating temperatures. For example, the bulk fuel temperatures in the aircraft tanks may range from a cold soaked low of −65° F to a hot soaked high of 140° F, a spread of 205° F. On a typical long duration flight at subsonic cruise following take-off from a hot locale, fuel bulk temperature may vary during that single flight from 120° F at take-off to −40° F after 8 to 10 hours of flight. At the other extreme, thermal temperature rise effects during extensive supersonic flight may raise fuel tank temperatures to the 200° F range. If a fuel-to-air heat exchanger is incorporated into the fuel distribution system in order to supply aircraft systems cooling requirements, the temperature of the fuel increases to even greater heights.

Any fuel distribution system designed for a gas turbine engine must therefore be relatively temperature insensitive. Unfortunately, the use of relatively small metering areas and moving parts within the fuel distribution system, when coupled with future, more stringent cooling requirements, may become impractical due to the coking effects on fuel at the higher operating temperatures being envisioned.

SUMMARY OF THE INVENTION

It is an object of this invention, therefore, to provide a variable impedance fuel distribution system for a gas turbine engine which is relatively temperature insensitive, which includes no moving parts downstream of a total flow fuel metering device, and which includes provisions for the incorporation of a fuel-to-air heat exchanger within the fuel distribution lines.

Briefly stated, this and other related objects are achieved by providing a fuel distribution system which includes a plurality of vortex valves connected to a pair of fuel manifolds which encircle the engine combustor. The fuel manifolds are connected to a fuel control through a flow regulator which meters fuel to the manifolds, which in turn provide primary flow and secondary flow to each vortex valve. The outputs of the vortex valves are then connected to suitable fuel injecting devices.

DESCRIPTION OF THE DRAWINGS

While the specification concludes with a series of claims which distinctly claim and particularly point out the subject matter which Applicant regards as his invention, a complete understanding of the invention will be gained from a reading of the following description, given in connection with the accompanying drawings, in which:

FIG. 3 is a schematic of a portion of a fuel distribution system constructed in accordance with the present invention;

FIG. 4 is a graphical plot of the characteristics of a typical vortex valve;

DESCRIPTION OF PREFERRED EMBODIMENTS

Figure 1:
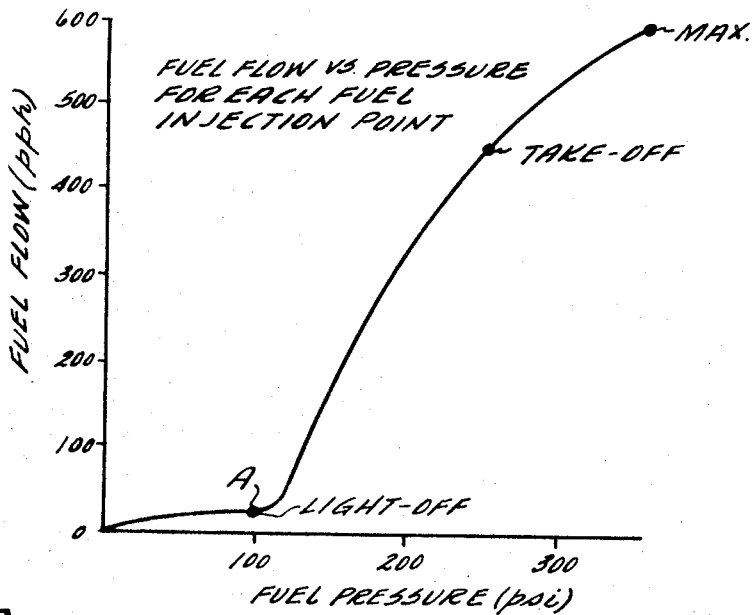
FIG. 1 is a graphical plot of a typical set of requirements for a gas turbine engine fuel distribution system.

Referring now to the drawings wherein like numerals correspond to like elements throughout, reference is directed initially to FIG. 1 wherein a typical set of requirements for an advanced engine fuel distribution system are plotted. As mentioned above, a fuel distribution system must accept metered flow from a fuel control and distribute it equally among each of the fuel distribution points of the engine. To accomplish this objective without overloading the fuel pump, it is necessary to provide a fuel distribution system having a variable impedance such as shown in FIG. 1. In many instances, this variable impedance is provided by using a dual orifice nozzle. Such a system normally combines a small low capacity orifice to provide initial fuel flow (up to point A of FIG. 1) with a larger high capacity orifice to provide the higher capacity needed after light-off is obtained. The dual orifice concept has one inherent problem, however, in that the overall system has an extremely high gain at the point wherein the second orifice begins to open. That is, as shown by the solid line curve in FIG. 2, at the point A where the second orifice begins to open the slope of the curve corrsponding to the flow through the secondary orifice is extremely steep (approaches infinity). As a result of this, a very small change in pressure can result in a significant change in the output of that particular fuel injection point. As previously mentioned, the head effects along on the flow within the fuel distribution system may be sufficient to cause slight pressure changes at each fuel injection point. Because of this high gain region associated with a dual orifice concept, this slight change in pressure due to head effects can result in significant differences in fuel flow from the various fuel injection points.

Referring now to FIG. 3, a fuel distribution system 10, which is capable of eliminating the above described problems, is shown to include a fuel control 12 which delivers metered fuel via a conduit 14 to a flow proportioner 16. The flow proportioner 16 splits the metered fuel, in a manner to be described, and delivers the same to either of two conduits 18 and 20. The conduits 18 and 20 are connected to fuel manifolds 22 and 24, respectively, which in the normal application would encircle the combustion zone of a gas turbine engine. Fuel is delivered from the fuel manifolds 22 and 24 to a plurality of dual outlet vortex valves 26, which also encircle the engine combustor. In order to provide fuel from the manifolds 22 and 24 to the valves 26, each of the vortex valves 26 has associated therewith a line 28 connecting the fuel manifold 22 to an inlet chamber 30, while a like number of lines 32 connect the fuel manifold 24 to radial inlets 34 of each of the vortex valves 26.

The vortex valves 26 are constructed in a typical manner to include the radial inlet 34 (normally known as the power inlet) and a tangential inlet 36 (normally known as the control inlet). Both the radial inlet 34 and the tangential inlet 36 direct fluid to a swirl chamber 38 which has associated therewith a pair of outlet orifices 40 (only one of which is shown), which in most cases would lie on opposite sides of the vortex valve 26.

The operation of a vortex valve constructed in accordance with the design shown in FIG. 3 is well known to those skilled in the art and will be discussed here solely to aid in understanding the present invention. Control fluid passes through the tangential inlet 36 to the swirl chamber 38 and follows a spiral path to one of the outlets 30. In the normal design, the radial inlet 34 is much larger than the tangential inlet 36 and power flow is introduced directly to the swirl chamber 38 through the radial passage 34, from which it has a direct passage to one of the outlets 40.

Referring briefly to FIG. 4, the characteristics of a vortex valve similar to one of those shown in FIG. 3 are plotted in terms of impedance versus pressure ratio. The pressure ratio in question is the ratio of the control fluid to the power fluid. As shown in FIG. 4, the vortex valve 26 will provide the necessary non-linear impedance for the fuel distribution system. That is, the output of the valve 26 varies non-linearly with increases in the pressure ratio. By proper design, the shape of the output (or impedance) curve can be varied from that shown in FIG. 4.

Figure 2:
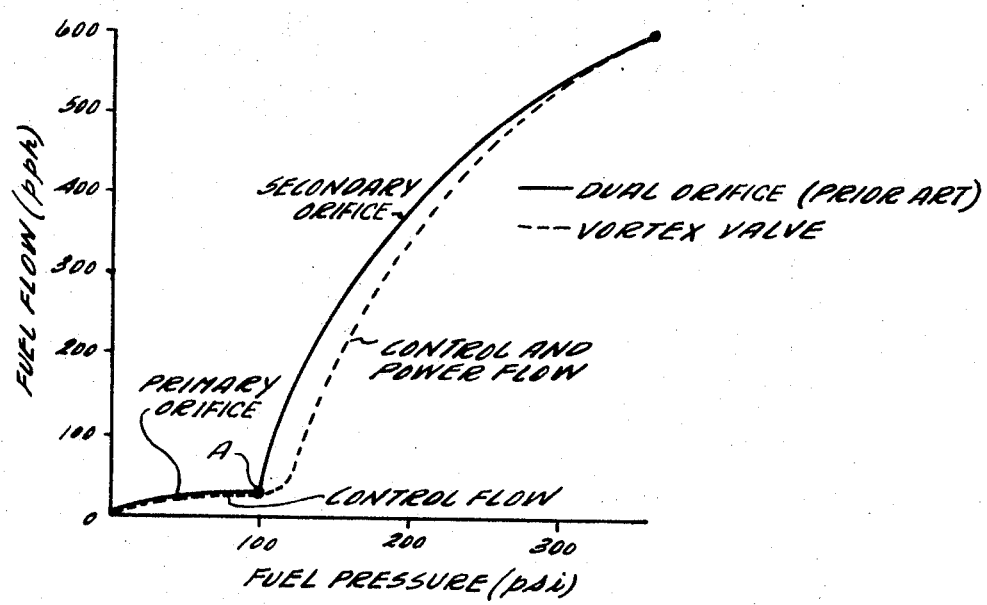
FIG. 2 is a graphical plot of the outputs of a prior art distribution system and a distribution system constructed in accordance with the present invention.

The output of a vortex valve designed for the present application is plotted as a dotted line in FIG. 2. As shown therein, the vortex valve 26 is capable of providing the required non-linear impedance without the sharp increases in gain associated with the dual orifice designs. Because of this, slight variances in pressure at each fuel injection point will not have as great an effect on actual fuel flow as that accompanying dual orifice designs.

As described above, the vortex valve 26 is capable of accurately providing the desired amount of fuel to each fuel injection point of the gas turbine engine when a properly metered amount of fuel is delivered to the radial inlet 34 and the tangential inlet 36 of the valve. Referring back to FIG. 3, the flow proportioner 16 performs the function of dividing the flow between the fuel manifolds 22 and 24 and thus delivers the proper amount of fuel to the radial inlets 34 and the tangential inlets 36. The flow proportioner 16 is shown in detail in FIG. 5 to include a housing 42 having a radial inlet 44 located on one side thereof and a pair of radial outlets 46 and 48 located on the opposite sides thereof. The housing 42 defines a chamber 50 which receives a sleeve 52, which is positioned within the chamber 50 by means of an extending lip 54 which abuts a stop 56 formed integrally with the housing 42. The sleeve 52 is maintained in this position by means of an end cap 58, which may be secured to the housing 42 in any suitable manner. Positioned within the sleeve 52 is a sliding spool 60 which is formed with an enlarged head 61, which cooperates with the sleeve 52 to form chambers 62 and 64 on opposite sides thereof.

Metered fuel from the fuel control 12 is directed to the inlet 44 of the flow proportioner 16. From the inlet 44 the metered fuel flows to the chamber 62 via passageway 66 formed within the housing 42 or to the chamber 64 through an orifice 68 formed between the sleeve 52 and the spool 60. The fuel within the chamber 62 is essentially at the same pressure level as that of the fuel within the inlet 44, while the fuel within the chamber 64 is at some reduced pressure level due to the pressure drop which occurs as the fuel flows across the orifice 68. Thus, a pressure differential exists on opposite sides of the head 61 of the spool 60. The spool 60, however, is biased to the left of the chamber 50 by means of a spring 70 positioned between the spool 60 and the end plate 58.

Figure 5:
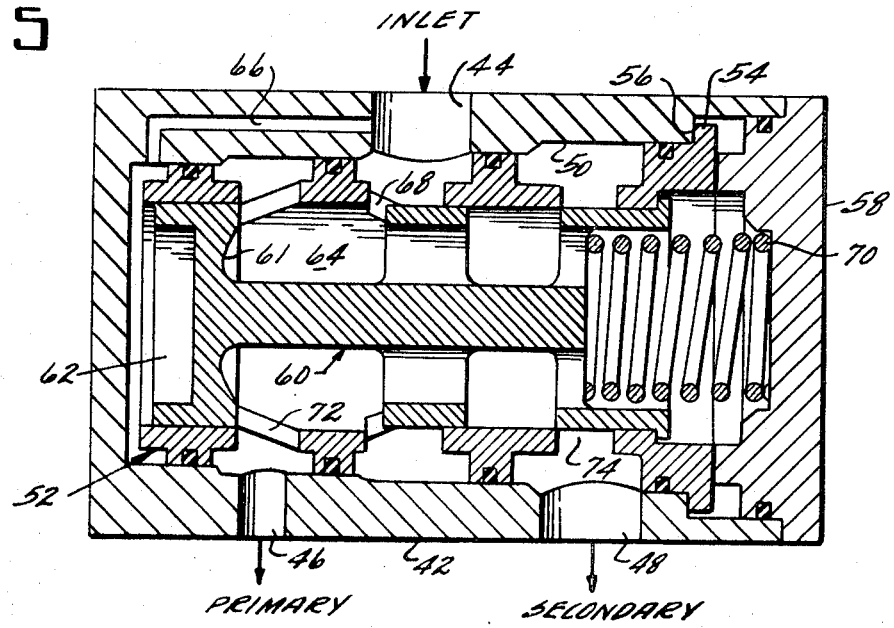
FIG. 5 is a sectional view of an element of the fuel distribution system of FIG. 3.

As further shown in FIG. 5, fuel flows from the chamber 64 to either the primary outlet 46 or the secondary outlet 48 through orifices 72 and 74, respectively, depending upon the position of the spool 60. Thus, in its initial position wherein the spool 60 is biased to the left by the spring 70, the entire flow from the chamber 64 is through the orifice 72 to the primary outlet 46 because the spool 60 is sized such that the orifice 74 is entirely blocked by the spool 60 when in this intial position. Once the pressure differential across the head 61 reaches a level sufficiently high enough to overcome the bias of the spring 70 (due to increased output of metered fuel from the main fuel control 12), the spool 60 will move to the right and the orifice 74 will begin to open while the orifice 72 begins to close. In this manner, primary flow through the primary outlet 46 will decrease while secondary flow through the secondary outlet 48 begins. As will be apparent to those skilled in the art, the actual levels of flow through the primary outlet 46 and the secondary outlet 48 and the ratio of the actual flows can be completely controlled by proper design of the orifices 68, 72, and 74. In this manner, the complete range of operation of the vortex valve 26 can be utilized to supply fuel to a fuel injection point of the gas turbine engine.

Referring again to FIG. 3, some further advantages of the inventive fuel distribution system will now be discussed. As set forth above, system cooling requirements for future generation aircraft will necessitate the use of a fuel-to-air heat exchanger in which the fuel will act as the major heat sink for all aircraft cooling requirements. In light of this requirement, a heat exchanger 80 is shown positioned within line 20 between the flow proportioner 16 and the fuel manifold 24. As is apparent from the above description of the vortex valve 26, the major portion of fuel flow to the vortex valve 26 is through the line 20 and the fuel manifold 24. That is, the major portion of fuel flow passes through the heat exchanger 80 and is thus available as a coolant or heat sink. As further shown in FIG. 3, there are absolutely no moving parts in the fuel distribution system downstream of the heat exchanger 80. The heated fuel is thus delivered directly to the combustor from the heat exchanger without passing through parts which are susceptible to detrimental effects from the high temperature fuel.

Another significant advantage to the presently described system is that the minimum areas in the system are the tangential inlets 36 of each of the vortex valves 26. When compared to the minimum area requirements for presently used spring loaded, contoured valves, the area of the tangential inlet 36 is much larger. This is expecially true of the system shown in FIG. 3 which utilizes dual outlet vortex valves wherein the inlet 36 is sized such that each valve delivers fuel to two engine fuel injection points. As is shown in FIG. 3, not only are the areas larger, but the fuel passed through the minimum areas is cool because it bypasses the heat exchanger 80. This further minimizes the coking problems associated with presently used designs. The fuel flow to the minimum areas is through the line 18 and the fuel manifold 22, as discussed above. If required, the line 18 may be provided with a suitable filter 82 to further protect the overall fuel distribution system. As is apparent from the above discussion, the maximum flow requirements through the filter 82 are much less than those associated with presently used systems because only the control flow is passed through the filter 82.

Figure 6:
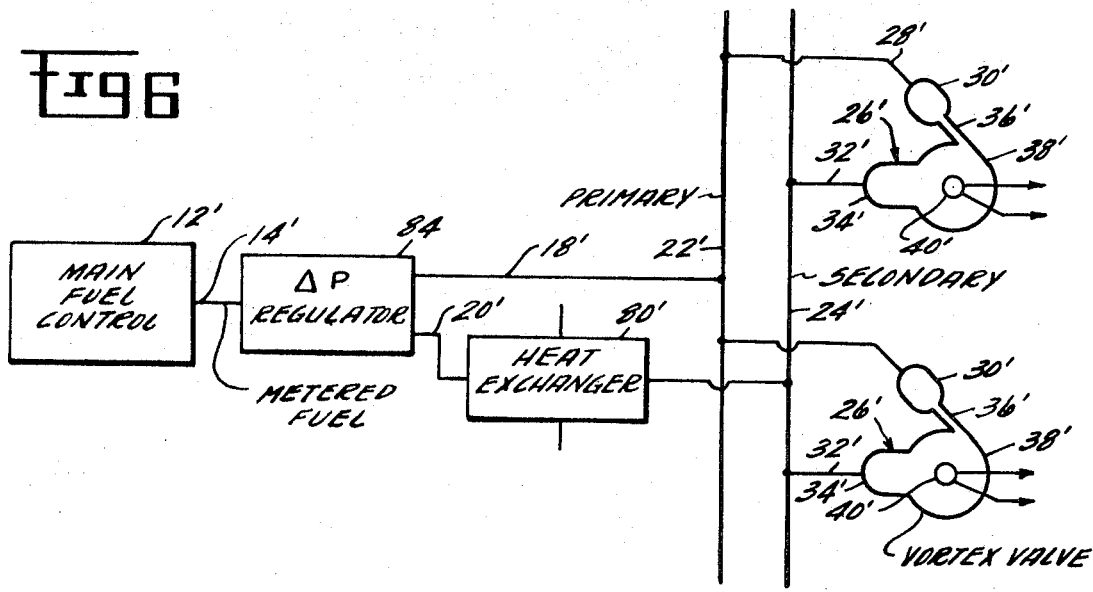
FIG. 6 is a schematic of an alternative embodiment.

Referring now to FIG. 6, another possible embodiment of the fuel distribution system is shown. This system is similar to that described in connection with FIG. 3 with the primary change being that the flow proportioner 16 of FIG. 3 is replaced by a $\Delta P$ regulator 84 which maintains a constant pressure differential between fuel manifolds 22' and 24'. In this system, metered fuel is delivered from the main fuel control 12' to the $\Delta P$ regulator 84 and is thereafter delivered to the fuel manifolds 22' and 24' via lines 18' and 20', respectively.

The principal disadvantage of this system, as opposed to that shown in FIG. 3, is that the $\Delta P$ regulator 84 limits the range of pressure ratios available for delivery to the vortex valve 26. Because of this, the system shown in FIG. 6 is incapable of using the complete flow range capabilities of the vortex valve 26. For example, as shown in FIG. 4 the $\Delta P$ regulator 84 may produce pressure ratios only in the range from point A to point B and the output of the vortex valve 26 would correspondingly be limited to that range of the curve of FIG. 4. While this range may be perfectly sufficient for certain applications, the flow proportioner 16 is not so limited and provides the capability of utilizing the entire flow range of each vortex valve. That is, the output of the flow proportioner 16 covers the complete range of pressure ratios ($P_{pri}/P_{sec}$ theoretically can range from zero to infinity) and thus allows the output of each vortex valve to range from point 0 to point C on the curve of FIG. 4. The system shown in FIG. 3 thus provides a more flexible working tool to the control designer.

It should be obvious to those skilled in the art that certain changes could be made in the above described systems without departing from the broad inventive concepts described. For example, the flow proportioner 16 (or the $\Delta P$ regulator 84), while shown to be a separate component above, could be formed integrally with the main fuel control 12. In this manner, the fuel control 12 would not only meter the entire fuel flow but would also divide the flow between the manifolds 22 and 24. The appended claims are intended to cover these and all similar changes which do not depart from the broad inventive concept taught herein.

What I claim is:

1. A fuel distribution system for a gas turbine engine comprising:
   a pair of fuel manifolds;
   means for delivering metered fuel to each of said manifolds;
   a plurality of vortex valves, each of said valves including a tangential inlet, a radial inlet, and outlet means;
   means for connecting a first of said manifolds to each of said tangential inlets;
   means for connecting the second of said manifolds to each of said radial inlets; and
   means for connecting the outlet means of said vortex valves to fuel injecting points of said engine.

2. A fuel distribution system as recited in claim 1 wherein said means for delivering metered fuel includes a flow proportioner.

3. The fuel distribution system recited in claim 2 wherein said outlet means of each said vortex valve comprises two outlets, each of which is connected to a fuel injecting point of said engine.

4. A fuel distribution system as recited in claim 3 wherein said means for delivering metered fuel to said second manifold comprises tubing positioned between an outlet of said flow proportioner and said second manifold, the tubing having associated therewith a heat exchanger.

5. A fuel distribution system as recited in claim 4 wherein said means for delivering metered fuel to said first manifold comprises tubing extending from a second outlet of said flow proportioner to said manifold, and said tubing includes a filter.

6. A fuel distribution system as recited in claim 5 wherein said flow proportioner comprises a sleeve valve.

7. A fuel distribution system as recited in claim 5 wherein said flow proportioner comprises a part of a main fuel control for said engine.

8. A fuel distribution system as recited in claim 1 wherein said means for delivering metered fuel includes a regulator which maintains a constant pressure differential between said first and second manifolds.

9. In a gas turbine engine fuel distribution system of the type which includes a fuel control for metering fuel, a plurality of fuel injecting points for injecting fuel into a combustion section of the engine, and associated tubing for delivering metered fuel from the fuel control to the fuel injecting points, the improvement comprising:
  a plurality of vortex valves positioned between the fuel control and the fuel injecting points, the outputs of said vortex valves providing fuel to the fuel injecting points.

10. In a gas turbine engine of the type which includes a compressor, a combustion section, and a turbine for driving the compressor, a fuel distribution system for delivering metered fuel to a plurality of fuel injecting points within the combustion section of the engine, said fuel distribution system comprising:
  a pair of fuel manifolds;
  means for delivering metered fuel to each of said manifolds;
  a plurality of vortex valves, each of said valves including a tangential inlet, a radial inlet, and outlet means;
  means for connecting the second of said manifolds to each of said radial inlets; and
  means for connecting the outlet means of said vortex valves to fuel injecting points of said engine.

* * * * *